Nov. 15, 1966   F. E. FLADER   3,285,062
EDUCATIONAL TURBOFAN PRESSURE AND ENERGY MEASURING APPARATUS
Filed Aug. 5, 1963   4 Sheets-Sheet 1
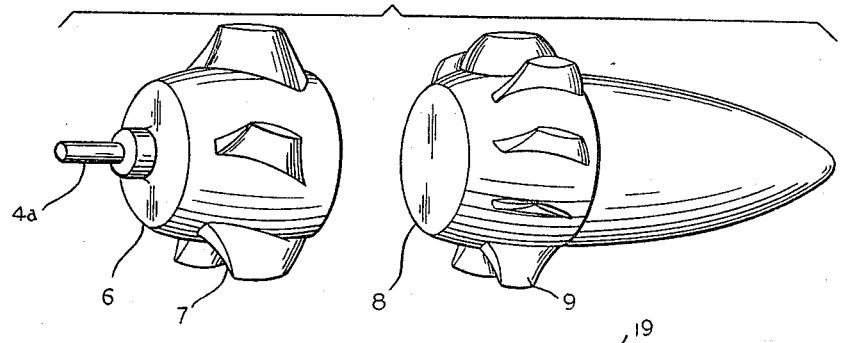
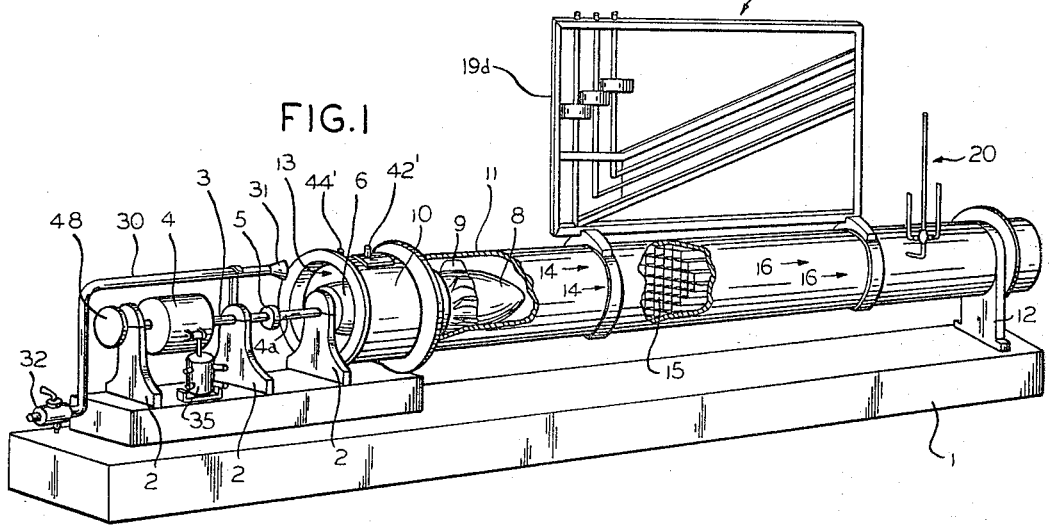
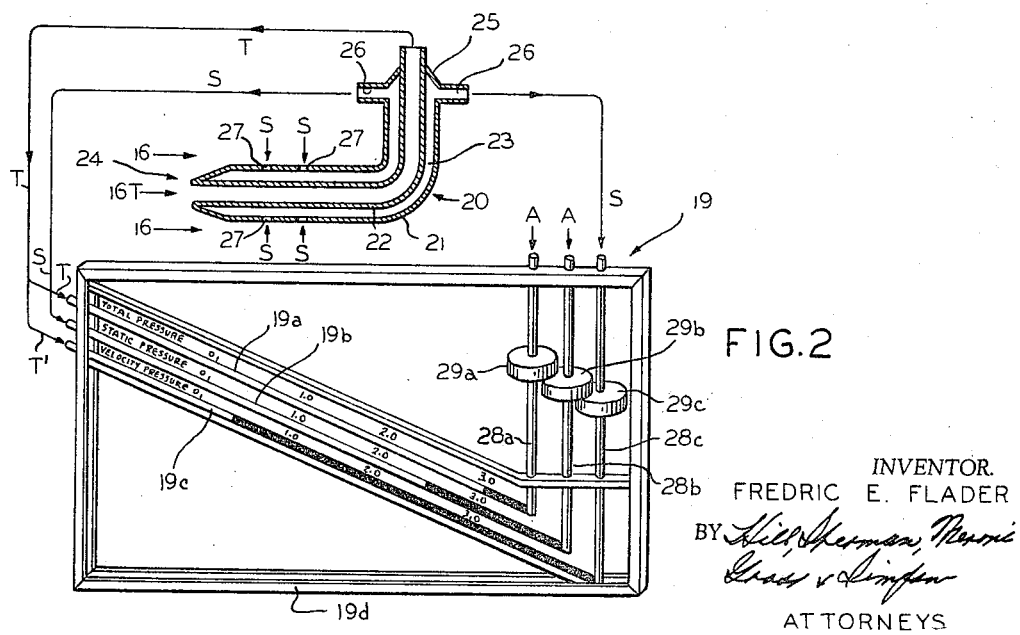
INVENTOR.
FREDRIC E. FLADER
BY
ATTORNEYS

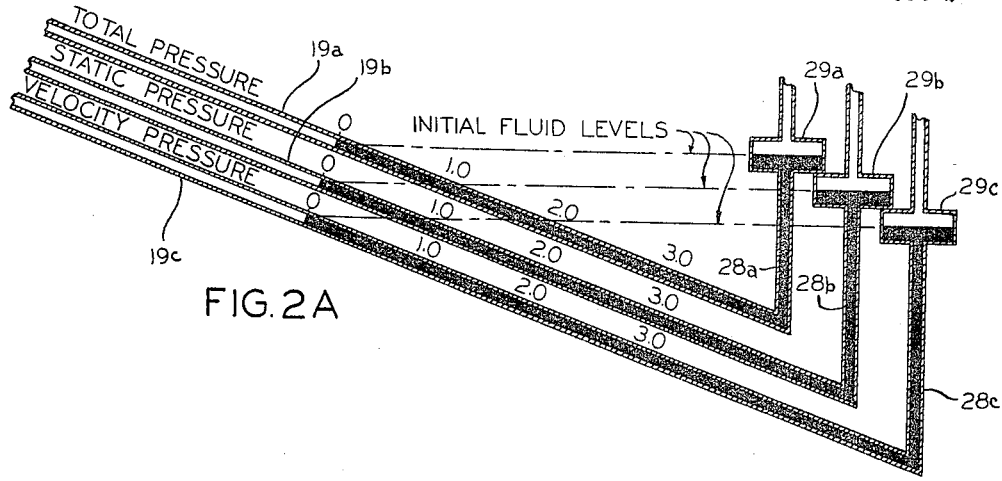
FIG. 2A
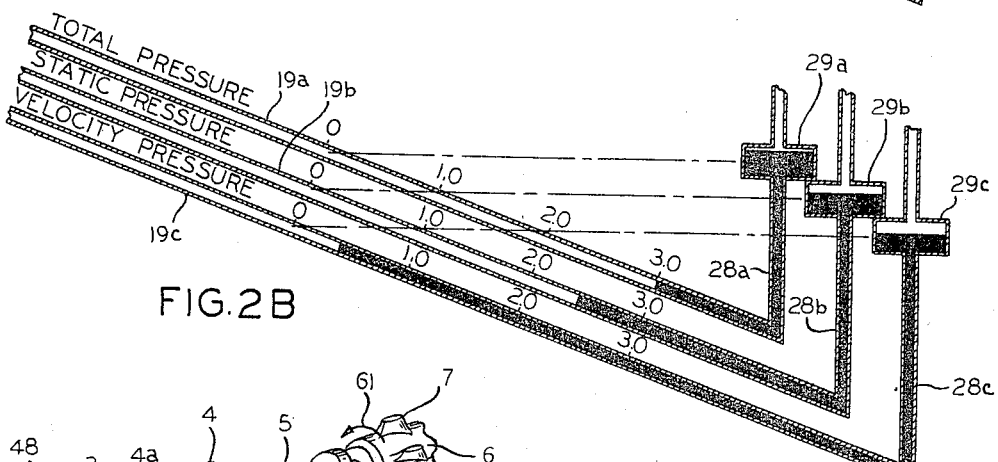
FIG. 2B
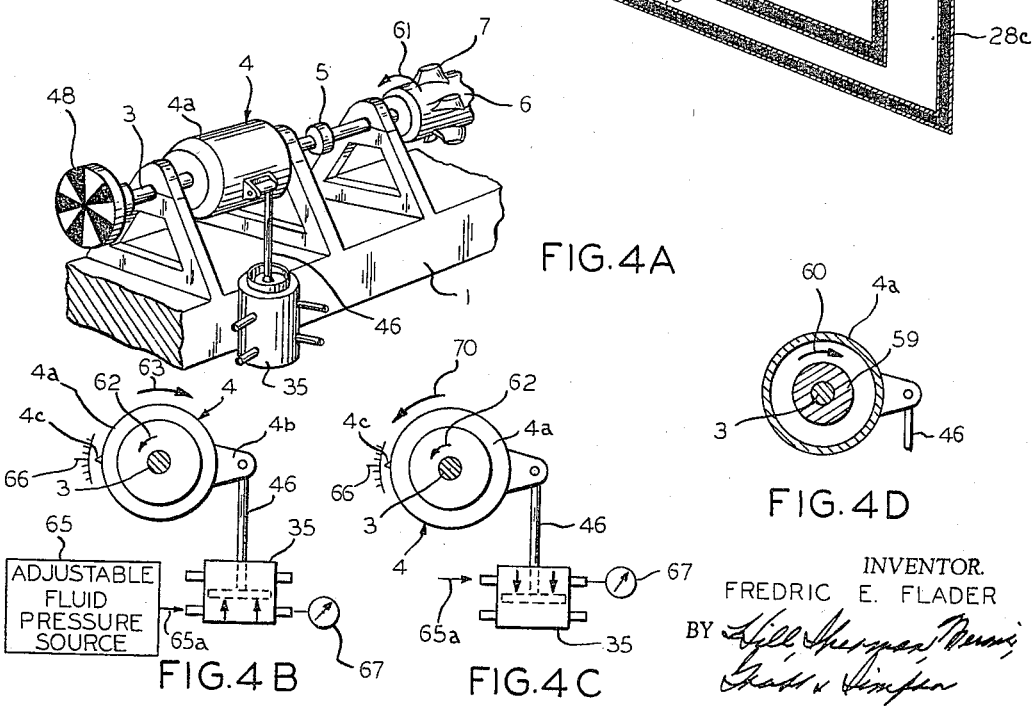
FIG. 4A
FIG. 4B
FIG. 4C
FIG. 4D
INVENTOR.
FREDRIC E. FLADER
BY
ATTORNEYS

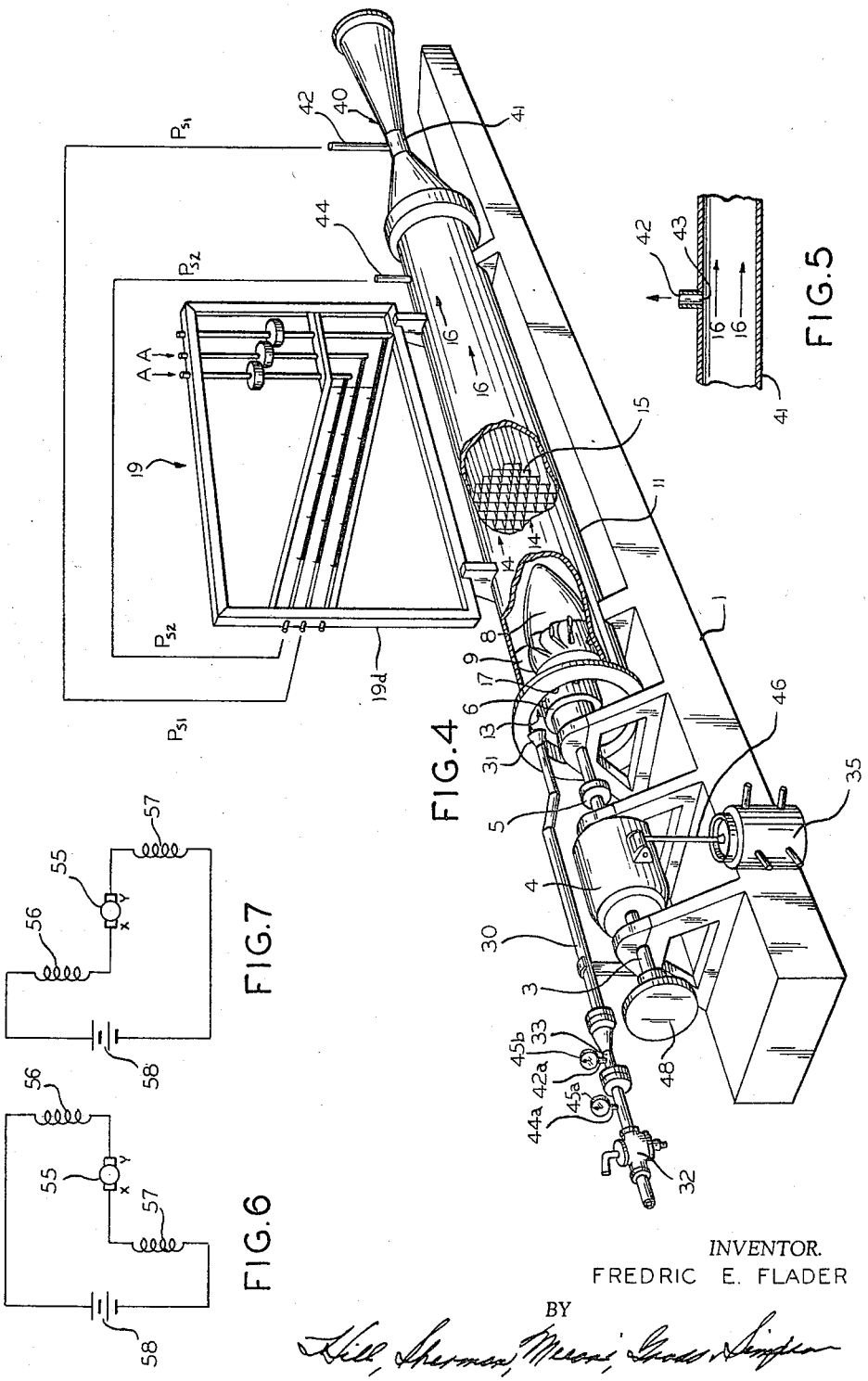

United States Patent Office 3,285,062
Patented Nov. 15, 1966

3,285,062
EDUCATIONAL TURBOFAN PRESSURE AND ENERGY MEASURING APPARATUS
Fredric E. Flader, Boca Raton, Fla., assignor to Scott Aviation Corporation, Lancaster, N.Y., a corporation of New York
Filed Aug. 5, 1963, Ser. No. 299,922
6 Claims. (Cl. 73—147)

This invention relates to an educational apparatus for measuring and demonstrating fluid pressure and energy values and more particularly to an educational turbofan apparatus which lends itself to numerous types of measurements.

An object of this invention is to provide a simple and compact apparatus which is readily portable for use in a classroom or a research laboratory in the teaching and measuring of air flow forces and energies involved in the establishment of such forces.

Another object of this invention is to provide an air force measuring and demonstrating apparatus in the form of a turbofan which also lends itself to use in measuring other forces such as that of the energy involved in establishing air flow.

Still another object of this invention is to provide a simplified form of air pressure measuring apparatus selectively usable in conjunction with an air duct or conduit and the measurement of the forces thereof such as static, velocity and total pressures and which, in addition, will afford a visual indication of such pressures.

Yet a further object of the invention is to provide a simple and portable classroom measuring and demonstrating apparatus which lends itself to a wide variety of experiments by an instructor or teacher conversant with fluid dynamic principles in the teaching of applied science.

In accordance with the general features of this invention there is provided in an educational apparatus for selectively measuring forces, a turbofan, an air flow duct receiving the output of the turbofan, measuring tubes in communciation at spaced intervals with the air flow in the duct, and a multiple of manometer tubes connected to the measuring tubes for measuring and affording a visual indication of different air pressures existent in the duct.

Another feature of the invention relates to the construction of the manometer tubes and their interrelationship with the ducts supplying air under pressure so as to also afford an indication of velocity pressure.

A further feature of the invention relates to the provision in the aforesaid apparatus of a turbofan arrangement such that the fan may be either actuated positively by an electric motor to serve as a compressor or may be used in conjunction with an air jet so as to serve as a turbine.

Other objects and features of this invention will more fully appear from the following detailed description taken in conjunction with the accompanying drawings which illustrate several embodiments thereof and in which:

FIGURE 1 is a perspective view illustrating a simple form of my turbofan apparatus and showing somewhat schematically the location of the measuring manometer tubes prior to their connection to the turbofan duct;

FIGURE 2 is a somewhat schematic view showing the measuring apparatus or manometer tubes and the manner in which they may be connected to the Pitot static and air velocity tubes formed for projection into the air duct of my apparatus;

Figure 8:
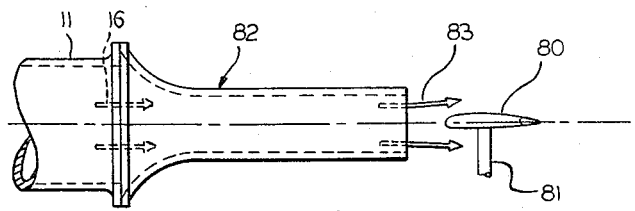
Figure 9:
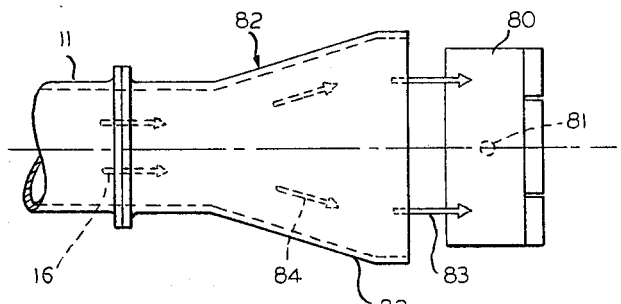
Figure 10:
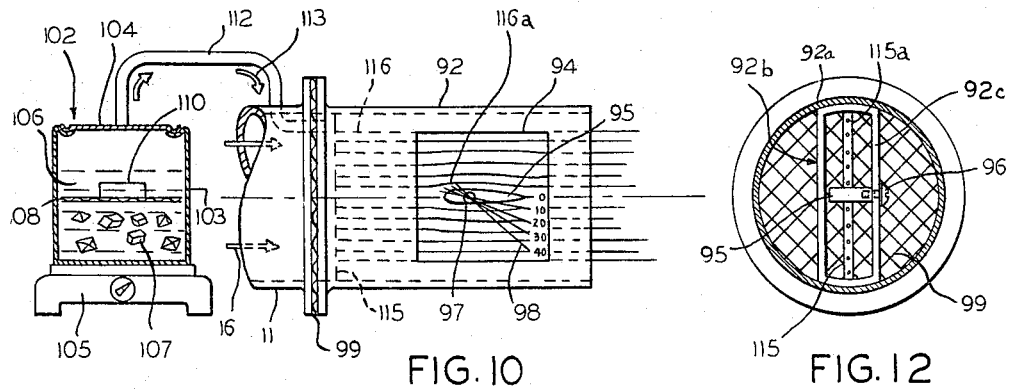
Figure 11:
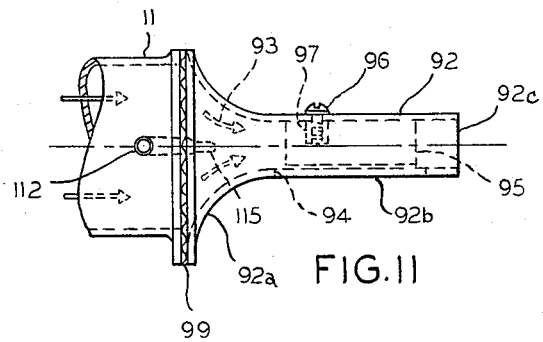

FIGURES 2A and 2B on Sheet 2 of the drawings are schematic views of the manometer tubes of FIGURE 2 showing the liquid levels therein initially and for a given flow condition in the air duct;

FIGURE 3 is an exploded perspective view of the two components of the aerodynamic fan of my apparatus, namely the bladed rotor and the bladed stator;

FIGURE 4 of the drawings on Sheet 3 is a perspective view of a somewhat larger form of my turbofan apparatus making use of a Venturi in conjunction with the manometer measuring tubes;

FIGURES 4A, 4B, 4C and 4D are fragmentary schematic views showing the motor and load cell portions of FIGURE 4, FIGURE 4B indicating the connections to the load cell when the turbofan is being driven by the motor, and FIGURES 4C and 4D indicating the connections to the load cell and other conditions when the motor is serving as an electrical absorption brake for the turbofan;

FIGURE 5 on Sheet 3 of the drawings is a fragmentary sectional detail view showing how one of the air tubes connected to the air duct of FIGURE 4 of the turbofan terminates in the duct;

FIGURE 6 on Sheet No. 3 of the drawings shows the electric energizing circuit for the motor when the motor is operated to drive the turbofan as a compressor;

FIGURE 7 on Sheet No. 3 of the drawings shows the electric energizing circuit for the motor when the motor is energized to serve as an electrical absorption brake with the turbofan being operated by compressed air as a turbine;

FIGURE 8 is a fragmentary somewhat diagrammatic side elevational view showing a diffuser attachment secured to the end of the primary delivery duct 11 of the apparatus of FIGURE 1 or FIGURE 4;

FIGURE 9 is a fragmentary top plan view of the arrangement of FIGURE 9;

FIGURE 10 is a fragmentary somewhat diagrammatic side elevational view showing a different type of diffuser attachment connected with the primary delivery duct of the apparatus of FIGURE 1 or FIGURE 4;

FIGURE 11 is a fragmentary top plan view of the structure of FIGURE 10; and

Figure 12:
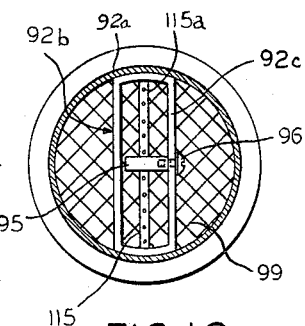

FIGURE 12 is a somewhat diagrammatic end elevational view of the structure of FIGURE 10.

As shown on the drawings:

At the outset it should be noted that in describing both forms of my apparatus common parts for purposes of simplicity, are designated by the same numerals. The principal difference resides in the manner in which the air pressure tubes, leading from the turbo-fan duct to the measuring apparatus, terminate in the duct discharge.

The reference character 1 designates a suitable portable base having a series of three spaced shaft supports or bearing brackets 2. A motor shaft 3 supporting an electric motor 4 is carried by two of the supports and is coupled by a coupling 5 to a rotor shaft 4a of a aerodynamic rotor 6 provided with a plurality of aerodynamic blades 7 as shown in FIGURE 3. Axially aligned with the rotor 6 is a non-rotating member termed a stator 8 which also has a plurality of blades 9 of aerodynamic form.

A fan rotor and stator housing 10 encloses these elements and is suitably supported on the base 1. This cylindrical housing 10 is aligned with and merges in air duct 11 supported by a bracket 12 at its free end.

It will be appreciated that upon rotation of the rotor 6 air enters the open end of the rotor housing at 13 and is induced by the rotor blades to flow between the fixed stator blades 9 into the main body of air duct 11 as indicated by the arrows 14. An air straightening cellular or honeycombed structure 15 is disposed lengthwise of the air duct 11 so that the induced air flows therethrough in a straight path as indicated by the arrows 16.

Referring now to FIGURES 1 and 2, it will be perceived that the right hand end of the duct is provided with a Pitot static tube structure designated generally by the reference character 20 which is connected to a multiple manometer tube structure designated generally by the reference character 19. For simplicity the interconnecting tubes between the static tube structure 20 and the manometer 19 are not shown in FIGURE 1 but are shown by arrowed lines in FIGURE 2.

The tube structure 20 includes an outer tube 21 and an inner tube 22 in telescoping spaced relationship and both of which are angled as illustrated. The space between the two tubes is designated by the reference character 23. The angled extremities of the two tubes are brought together in a point as shown at 24 so that this pointed end has a pressure tight connection. The angled ends of the Pitot tube structure 23 extend into the air duct 11 so that the pointed end 24 extends toward the upstream of the duct and in the path of the air flow 16.

Opposed ports 26 are incorporated in the Pitot tube structure near the junction 25 of the two tubes 21 and 22 and these ports communicate with the space 23 between the tubes 21 and 22. Also, a series of holes 27 are provided in the outer tube 21 and in communication with the air flow 16 inside of the duct 11.

The measuring structure or manometer 19 comprises three angled manometer tubes 19a, 19b and 19c with suitable scales as noted and marked total pressure, static pressure and velocity pressure.

The angled manometer tubes including the upwardly inclined graduated portions 19a, 19b and 19c terminate at their lower extremities in vertical tubes 28a, 28b and 28c and fluid reservoir portions 29a, 29b and 29c. One such vertical tube and reservoir portion is provided for each of the angled manometer tubes. This triple manometer structure is, in turn, all suitably carried by a generally rectangular frame 19d as shown.

The installation of the Pitot static tube in the duct 11 of FIGURE 1 is arranged so that the pointed end at 24, providing the opening to the interior tube 22, is pointed directly in line with the air stream 16. Also, the openings 27 in outer tube 21 are in the path of, and arranged to receive, air from the stream 16.

A small portion of this air enters the Pitot static tube 22 through the opening at 24 and is designated by the arrow 16T. The letter T has been used as symbolic of total pressure and is used to designate diagrammatically the conduit connection between the upper end of inner Pitot tube 22 and the total pressure manometer tube 19a. With this connection the force of the moving air in 16T is thus exerted on the fluid in total pressure manometer tube 19a which at the extremity of its vertical tube 28 is exposed at A to the atmosphere.

As an example, the pressure T has displaced the fluid from the inclined manometer tube 19a from a position of zero reading on the scale as shown in FIGURES 2 and 2A to a reading of 3.0 against the atmospheric pressure indicated at A on the vertical tube or leg 28a of manometer tube 19a. The fluid so displaced causes a slight rise in the fluid level in the reservoir 29a as indicated in FIGURE 2B until the force exerted by the air pressure (16T minus A) is exactly balanced by the weight of that part of the fluid in tube 28a and reservoir 29a above the point 3.0. The cross section of the reservoirs may be such that the vertical displacement in the reservoirs above the initial fluid levels introduces an error in the readings of only approximately 1 percent.

The static pressure of the fluid in the duct 11 (indicated by the arrowed symbol S in FIGURE 2) is communicated to the interior of outer Pitot tube 21 and is transmitted through opposed ports 26 by conduit lines marked S to the manometer structure 19. The lefthand conduit line S extends to and is connected to the upper end of the inclined static pressure manometer tube 19b. The righthand conduit line S is connected to and communicates with the interior of the righthand vertical tube 28c associated with the velocity pressure tube 19c.

Again, as an example, this static pressure S moves the column of fluid in static pressure manometer tube 19b, while opposed by the atmospheric pressure A on its vertical tube 28b, from zero to 2.5.

A third concept or type of pressure is known as velocity pressure which is measured by manometer tube 19c. When the three types of pressure are associated with the same duct stream 16, as illustrated, the magnitude of this velocity pressure is equal to the total pressure less the static pressure. Hence, in the illustrated example, the value of the velocity pressure is 0.5 which is equal to 3.0 less 2.5. Physically this subtraction is achieved by connecting the total pressure conduit T by a line or conduit T' to the upper end of the inclined velocity pressure manometer tube 19c and by connecting the static pressure line S from the righthand port 26 to the vertical velocity pressure tube 28c as shown at the right of FIGURE 2. The effect of this is to cause static pressure to buck the larger total pressure resulting in a differential pressure called velocity pressure.

Another way to think of this is to consider that still air possesses only static pressure whereas moving air has another type of pressure due to its velocity added to the static pressure and that the two are equal to the total pressure. In still air the static pressure is also total pressure since velocity pressure is zero. The effect of increasing the velocity of a moving stream is to reduce the static pressure and increase the velocity pressure for the same total pressure. These concepts may, of course, be expressed, as is well known, in mathematical terms. They are, however, frequently difficult concepts for a student to understand. The above described equipment, illustrated in FIGURES 1 and 2, enables a student to observe the actual effects visually. Further, as shown in FIGURE 2, the differences between these types of pressures are presented graphically to the student in the manometer structure 19 thus making these relationships very much easier to grasp, understand and master.

Now in both forms of my apparatus shown in FIGURES 1 and 4, the turbofan 6 can either be driven by the motor 4 to serve as a compressor or it may be used as an air operated turbine. To effect this latter use, an air pressure tube 30 is provided having a nozzle 31 positioned adjacent to and to discharge into the entry opening 13 of the rotor 6. Air from any suitable source, such as a conventional air compressor set (not shown) is piped through a shut-off valve 32 to the supply tube 30 and nozzle 31. A variation of this using a Venturi 33 (FIGURE 4) will be described in conjunction with the second form of my apparatus.

Also, the electric motor 4 may have associated with it a torque measuring device in the form of a load cell 35 connected to the stator of the motor and which is the subject of my copending patent application Serial No. 299,919, filed August 5, 1963 and now abandoned. In other words, my present turbofan apparatus lends itself very well for use in conjunction with the measuring of torque or energy. The load cell may be either mounted on top of the base 1, as shown in FIGURE 1, or alongside of the base as shown in the form of FIGURE 4. I shall describe this aspect of my invention more fully in connection with the second form of my apparatus.

Now referring to the second form of apparatus shown in FIGURE 4, it will be noted that it is substantially similar to the first form and, hence, the same numerals have been employed to designate parts substantially common to both forms. Here the main air duct 11 terminates in a Venturi tube 40, the throat 41 of which has connected to it a tube 42 having a flush or smooth inlet opening 43 (FIGURE 5) inside of the Venturi 40. A tube 44 (FIGURE 4) upstream from the Venturi tube 40 has a similar flush inlet connection to the inside of duct 11.

The two tubes 42 and 44 are connected by pipe lines (shown diagrammatically) $P_{S1}$ and $P_{S2}$ to two of the inclined tubes of the manometer structure corresponding to manometer structure 19 (FIGURE 4). Here, the vertical legs of such tubes, as in FIGURE 2, are exposed at A, A to the atmosphere.

Now it will be appreciated that the velocity of the air at the restriction 41 of the Venturi 40 will be considerably increased compared to that of the air flowing in duct 16 since the mass of air flowing per unit of time must pass through the smaller opening of the Venturi throat. This increase in velocity will be accompanied by a reduction in static pressure so that the static pressure $P_{S2}$ as measured from tube 44 is greater than that of the pressure at tube 42 communicating with line $P_{S1}$. The differential measurement, i.e. ($P_{S2}$ minus $P_{S1}$) is a primary quantity needed to compute the velocity, the volume of air and its mass flowing per unit time through the duct and Venturi, and so this is a measure of the output of the rotor-stator combination. In this instance, the two manometer tubes that are utilized may be provided with suitable indicia and measurement calibrations in substantially the same manner as in FIGURE 2.

The inlet pressure openings of conduits 42 and 44 may be otherwise located as desired in the air duct structure to sense static pressure values. For illustration, as shown in FIGURE 1, tubes 42′ and 44′ could be located at the area of the rotor 6 and stator 8. One could be located just before the rotor and the other behind the stator and connected to two tubes of the manometer structure 19.

It will also be noted that in the form of the turbofan shown in FIGURE 4 the duct 11 also serves to encompass the rotor 6 and the stator 8 instead of using a separate housing 10 as in the first form.

In addition, the air jet duct 30 leading to the rotor opening 13 has, as noted before, disposed in it a Venturi restriction 33 with a throat section measuring conduit 42a. Upstream from this conduit in the pipe line 30 is another measuring orifice conduit 44a. These two measuring conduits or orifices correspond with 42 and 44 and may be connected to gages 45a, 45b (for example each having a range from zero to 60 p.s.i.) for affording a measurement of the differential in pressures. In other words, with such an arrangement it is possible to measure and compute velocity and mass flow of air supplied to nozzle 31 discharging into turbine opening 13.

In FIGURES 6 and 7 I have illustrated how the circuitry of the turbofan motor 4 can be reversed whereby the rotor 6 may be either positively driven by the motor or may be operated as a turbine by compressed air from jet 31. The number 55 designates the armature of the motor with its two poles shown at X and Y. Numerals 56 and 57 indicate the left and right sides of the motor stator wiring and the numeral 58 indicates the external D.C. source of power. When the motor 4 is being used as a driving motor the armature poles are connected by the wiring as indicated in FIGURE 6. When it is desired to operate the rotor 6 by compressed air as a turbine, the connections to poles X and Y are reversed as in FIGURE 7. In this situation the motor stator tends to drive the rotor indicated diagrammatically at 59 in FIGURE 4D in a clockwise direction relative to the stator as indicated by arrow 60 opposing the direction of rotation of the turbine. The motor when operated in this fashion can be employed as an electrical absorption brake or dynamometer by connecting the motor case 4a by a rod 46 to the torque resisting device or load cell 35. In FIGURE 4A, arrow 61 indicates the direction of rotation of turbine rotor 6 whether the motor 4 drives the rotor 6 or is used as an electrical absorption brake. Arrow 62 in FIGURES 4B and 4C indicates the corresponding direction of rotation of motor shaft 3. In FIGURE 4B, the motor is energized as indicated in FIGURE 6, so that the motor case 4a tends to rotate in the direction of arrow 63. Fluid pressure from source 65 is supplied by line 65a to the lower chamber of load cell 35 and is adjusted to be of a value to establish an equilibrium condition with arm 4b on motor case 4a disposed at right angles to rod 46. This angular position of motor case 4a may be indicated by a pointer 4C on case 4a registering with a fixed index mark diagrammatically indicated at 66. The pressure in the lower chamber as read by gage 67 will give a measure of the torque transmitted to the motor case 4a where the upper chamber is substantially at atmospheric pressure.

In FIGURES 4C and 4D, the turbine rotor 6 is being driven in the direction of arrow 61, FIGURE 4A, by air discharged from nozzle 31, FIGURE 1. The motor is energized as indicated in FIGURE 7 so as to act as an electrical absorption brake with the result that the torque tending to rotate motor shaft 3 in the direction of arrow 62, FIGURE 4C, is transmitted to the motor case as indicated by arrow 70. In FIGURE 4C, the pressure from source 65, FIGURE 4B, is supplied via line 65a to the upper chamber of load cell while the lower chamber is substantially at atmospheric pressure. The pressure supplied by line 65a in FIGURE 4C is adjusted to maintain motor case pointer 4c at the angular position determined by index mark 66 so that gage 67 provides an indication related to the torque transmitted to the motor case 4a from turbine rotor 6.

Referring to FIGURES 6 and 7, a reversing switch may control the interconnection of windings 56 and 57 with armature terminals X and Y so as to conveniently change the motor circuit from that shown in FIGURE 6 to that shown in FIGURE 7.

While the load cell 35 may be constructed in accordance with the disclosure of my copending application, any conventional torque arresting device may be employed for the purpose.

It will be appreciated that the operation of the rotor or fan of my apparatus as a turbine provides an additional avenue of exploration for a student. Here the turbine operation is brought about by the introduction of compressed air from the jet or nozzle 31 which provides an input of pressure (potential) energy and velocity (dynamic) energy in combination. Further, the system output in mechanical energy may be dissipated as heat by the use of the aforedescribed electrical brake as indicated in FIGURES 4C, 4D and 7.

Operation of the rotor 6 by the electric motor involves an input of electrical energy to the motor and an output of energy to the operating fluid, which is air, and this energy appears as an increase in pressure (potential) and velocity (dynamic) energy with respect to the air discharged.

The flexibility of my apparatus is further demonstrated by the fact that both forms may readily accommodate an r.p.m. measuring device based, for example, on the use of the stroboscopic principle and such a device is diagrammatically shown at 48 in FIGURE 4A as being connected to the motor shaft 3. Thus, the experimenter using my turbofan apparatus may, in addition to all the other measurements described determine the power developed by the motor at any operating point by knowing the speed and torque.

In summary, information concerning the dynamic performance of my apparatus which may be derived from measurements made in conjunction therewith are as follows:

*For the compressor*

(1) Static pressure rise through the compressor
(2) Mechanical energy delivered to the compressor
(3) Mass flow of air delivered by the compressor
(4) Energy content of the delivered air stream
(5) Static, velocity and total heads in the exit duct
(6) Electrical energy input to the motor
(7) Efficiency of this electrical to mechanical conversion (8) Velocity in the exit duct and Venturi
(9) Efficiency of the compressor

*For the turbine*

(1) Mass flow of air delivered to the turbine
(2) Static pressure drop through the turbine
(3) Mechanical energy output of the turbine
(4) Energy content of the air delivered to the turbine
(5) Energy content of the air exiting from the turbine
(6) Efficiency of the turbine Further, the air duct 11 in either form of apparatus may be made of metal or clear plastic. When it is made of clear plastic it is possible for the student to observe the pattern of air flow particularly if smoke is injected into the tube. This is easily accomplished by virtue of the accessibility to the interior of the duct from opening 13. Any suitable or conventional smoke generator may be employed for delivering smoke into the opening 13. With smoke flowing through the apparatus, the directions of air flow and various phenomena associated with increasing and decreasing velocities, changes in direction and flow around objects are made clearly visible.

FIGURE 8 shows an airfoil model 80 coupled by means of a spindle 81 to a suitable force measuring system such as shown in my copending application entitled, "Educational Load Cell for Demonstrating and Measuring Forces," U.S. Serial No. 299,919, filed August 5, 1963 and now abandoned. A more detailed showing of certain aspects of the force measuring system for association with the spindle 81 is found in a copending application of J. Ripley Kiel entitled, "Educational Force Moment Indicator," U.S. Serial No. 299,923, filed August 5, 1963, now patent 3,240,059 dated March 15, 1966. The airfoil is shown in the air stream 83 produced by a diffuser device 82 coupled directly to the discharge end of the primary delivery duct 11 of the apparatus of FIGURE 1 or 4. As seen in FIGURE 9, the air stream indicated at 16 from the duct 11 diverges or diffuses in the horizontal direction as indicated by arrows 84 as it travels in the flaring portion 82a of diffuser 82 so that a relatively wide stream of air is discharged as indicated at 83, the air stream having a width at least corresponding to the width of the aerodynamic model 80. The equipment of the present invention is thus readily adapted to function as a wind tunnel and aerodynamic model testing apparatus.

FIGURES 10, 11 and 12 illustrate a further arrangement in accordance with the present invention wherein the primary delivery duct 11 of the apparatus of FIGURE 1 or FIGURE 4 is provided with a diffuser attachment 92 which receives the air flow indicated by arrow 16 from the turbofan apparatus of FIGURE 3 and causes the air flow to converge as indicated by arrows 93 in a converging section 92a of the attachment 92. The air or other fluid then flows through a constant cross section portion 92b of the attachment and is discharged at the open end of the attachment indicated at 92c.

It will be seen that the diffuser 92 is made quite narrow in the secion 92b but has a height substantially corresponding to the diameter of duct 11. A glass window 94 is provided in one side wall of section 92b so as to provide for observation of a short span airfoil 95 secured inside of the test section 92b by a screw 96. The screw 96 projects through a wall of section 92b into a threaded bushing 97 which may be secured integrally within the airfoil 95. The angle of attack of the airfoil 95 is adjustable by loosening screw 96 and retightening the same in the desired angular position as indicated by lines 98 in FIGURE 10 associated with the numbers 0, 10, 20, 30 and 40 representing the angle of the airfoil model to the direction of flow of the air stream or the like, the lines and numbers being etched on the glass 94. A screen 99 interposed between the main duct 11 and the diffuser 92 serves to straighten the air flow as indicated by arrows 16 (remove eddys and whirl) before it flows over and around the airfoil model 95.

A device 102 may be termed a smoke generator and consists of a container 103 equipped with a removable cover 104. This container rests upon an electrical hotplate 105. The vessel contains a mixture of water 106 and Dry Ice ($CO_2$) indicated by the reference numeral 107. A screen 108 is weighted by a weight 110 and serves to keep the Dry Ice down toward the bottom of the container. Upon application of heat by means of the hotplate a dense white smoke-like $CO_2$ vapor is formed in the container. The vapor flows through a pipe 112 as indicated by the arrow 113 and is delivered to a manifold pipe indicated at 115. This manifold is perforated along its edge to provide a series of holes as indicated at 115a in FIGURE 12 for delivering the vapor in a series of fine filaments as indicated at 116 in FIGURE 10 which flow around the wing model 95 as indicated at 116a, providing very clear and graphic pictures of such phenomena as laminar flow, turbulent flow, downwash angle, stall and the like. Other models such as streamline shapes, nozzles, diffusers, cylinders and the like may be placed in the test chamber of section 92b for similar smoke flow studies.

Referring to FIGURE 12, it will be observed that the wall of converging section 92a has been broken away to show the screen 99 in a diagrammatic fashion.

It will be apparent that many further modifications and variations may be effected without departing from the scope of the novel concepts of the present invention.

I claim as my invention:

1. In an educational apparatus for selectively measuring forces, a turbofan, an air flow duct receiving the output of said turbofan, measuring tubes in communication at spaced intervals with the air flow in said duct, a multiple of manometer tubes connected to said measuring tubes for measuring and affording a visual indication of different air pressures existent in said duct, said manometer tubes including at least two with parallel upwardly inclined legs with calibrations thereon and having their lower ends connected to vertical legs which are open to atmospheric pressure and a third angled manometer tube with an inclined leg and a vertical leg interconnected with the inputs to the other manometer tubes for the measuring of velocity pressure, and air jet means for selectively driving said turbofan, said air jet means comprising an air jet tube with a Venturi and a throat measuring orifice at said Venturi and an orifice tube upstream from said throat orifice adapted for connection to said manometer tubes for the measuring of differential pressures in said air jet tube.

2. In an educational apparatus for selectively measuring forces, a turbofan, an air flow duct receiving the output of said turbofan, an electric motor for driving said turbofan as a compressor, circuit connections for said motor for changing the direction of energization of said motor whereby the motor may be selectively used as a drive or as an electrical obsorption brake for said turbofan, fluid jet means for discharging into said fan for driving the fan as a turbine, and means coupled to said motor for providing a measure of output torque of said motor during driving of said turbofan as a compressor and for measuring the torque exerted by said motor when acting as an electrical absorption brake for said turbofan operating as a turbine to provide a basis for computing the mechanical energy delivered to the compressor and the mechanical energy output of the turbine.

3. In an educational apparatus for selectively measuring forces, a turbofan, an air flow duct receiving the output of said turbofan, measuring tubes in communication at spaced intervals with the air flow in said duct, a multiple of manometer tubes connected to said measuring tubes for measuring and affording a visual indication of differential air pressures existent in said duct, and air jet means for selectively driving said turbofan, said air jet means comprising an air jet tube with a Venturi and a throat measuring orifice at said Venturi and a orifice tube upstream from said throat orifice adapted for connection to said manometer tubes for the measuring of differential pressures in said air jet tube.

4. In a compact educational apparatus for selectively measuring forces, a portable base, a turbofan mounted on said base, an air flow duct mounted on said base and receiving the output of said turbofan, measuring tubes disposed along said duct in communication at spaced intervals with the air flow in said duct a multiple of manometer tubes carried by said base connected to said measuring tubes for measuring and affording a visual indication of different air pressures existent in said duct, said manometer tubes including at least two with parallel upwardly inclined legs with calibrations thereon and having their lower ends connected to vertical legs which are open to atmospheric pressure and a third angled manometer tube with an inclined leg and a vertical leg interconnected with the inputs to the other manometer tubes for the measuring of velocity pressure, an electric motor mounted on said base and connected to said turbofan for driving the same as a compressor, a controlled air jet mounted on said base for discharging into said fan whereby the motor and air jet may be selectively used to drive said fan as desired and pressure measuring means connected to said air jet and adapted for communication with said manometer tubes for measuring differential pressures in said air jet.

5. In an educational apparatus for selectively measuring forces, a turbofan, means for selectively driving said turbo fan as a compressor and a turbine, an air flow duct receiving the output of said turbofan, measuring tubes in communication with the air flow in said duct for sensing static and total pressure in said duct, and a multiple of manometer tubes connected to said measuring tubes for measuring and affording a visual indication of static and velocity pressures in said duct, together with a diffuser device connected with the end of said duct for receiving fluid flow therefrom and having an interior passage of cross section which becomes progressively more elongated at successive points along the length thereof to provide a discharging fluid stream, and means for mounting a model in said discharging fluid stream to demonstrate the characteristics of the stream as it flows around said model.

6. In an educational apparatus for selectively measuring forces, a turbofan, means for selectively driving said turbofan as a compressor and a turbine, an air flow duct receiving the output of said turbofan, measuring tubes in communication with the air flow in said duct for sensing static and total pressure in said duct, and a multiple of manometer tubes connected to said measuring tubes for measuring and affording a visual indication of static and velocity pressures in said duct, together with a diffuser device secured to the end of said duct and having a fluid passage therein, means for mounting a model within said passage, said device having a transparent wall for observation of the fluid flow past said model, and means in said device for introducing a visible smoke-like material into said fluid passage upstream of said model mounting means to provide for visual observation of the flow pattern past said model.

References Cited by the Examiner

UNITED STATES PATENTS

| | | | |
|---|---|---|---|
| 948,872 | 2/1910 | Clark | 73—212 |
| 1,428,363 | 9/1922 | Dreiske | 73—401 |
| 1,968,382 | 7/1934 | Fales | 73—147 |
| 2,265,787 | 12/1941 | White | 73—168 X |
| 2,466,358 | 4/1949 | Besserdich et al. | 60—6 |
| 2,616,291 | 11/1952 | Bendum | 73—147 |
| 2,618,969 | 11/1952 | Hornbarger | 73—116 |
| 3,054,288 | 9/1962 | Bowman et al. | 73—168 |

FOREIGN PATENTS 521,143  5/1940  Great Britain.

DAVID SCHONBERG, *Primary Examiner.*